United States Patent [19]

Bissett et al.

[11] Patent Number: 5,348,921
[45] Date of Patent: Sep. 20, 1994

[54] METHOD FOR REDUCING SULFATE FORMATION DURING REGENERATION OF HOT-GAS DESULFURIZATION SORBENTS

[75] Inventors: Larry A. Bissett; Larry D. Strickland, both of Morgantown; John M. Rockey, Westover, all of W. Va.

[73] Assignee: The United States of America as represented by the United States Department of Energy, Washington, D.C.

[21] Appl. No.: 76,060

[22] Filed: Jun. 14, 1993

[51] Int. Cl.$^5$ .......... B01J 38/34; B01J 38/16; B01J 23/92; C01B 17/00
[52] U.S. Cl. .......... 502/43; 423/230; 423/231; 423/244.01; 502/51; 502/52
[58] Field of Search ............ 502/49, 51, 52, 43, 502/47, 517; 423/230, 231

[56] References Cited

U.S. PATENT DOCUMENTS

| | | | |
|---|---|---|---|
| 4,088,736 | 5/1978 | Courty et al. | 423/230 |
| 4,155,990 | 5/1979 | Kimura et al. | 423/574 R |
| 4,233,275 | 11/1980 | Kimura et al. | 423/230 |
| 4,273,749 | 6/1981 | Kimura et al. | 423/231 |
| 4,310,497 | 1/1982 | Deschamps et al. | 423/231 |
| 4,374,105 | 2/1983 | Anderson et al. | 423/230 |
| 4,442,078 | 4/1984 | Jacam et al. | 502/52 |
| 4,732,888 | 3/1988 | Jha et al. | 423/230 |
| 4,857,285 | 8/1989 | Gal | 423/230 |

FOREIGN PATENT DOCUMENTS 909108 10/1962 United Kingdom .......... 423/230

OTHER PUBLICATIONS

"The Operation of the Frodingham Desulfurizing Plant at Exeter", The Chemical Engineer, Mar. 1990, pp. 55–62 (Mar. 1967).

"Gas Stream Cleanup Papers from DOE/METC Sponsored Contractors Review Meeting in 1988" R. C. Bedick et al, DOE/METC-89/6069 Oct. 1988, pp. 294–303.

"Hydrocarbon Processing", Refining Handbook '90, Nov. 1990, pp. 94, 96, 98.

"Fundamental Studies and Present Status of IHI Hot Gas Desulfurization Process", T. Sugintani et al, 198 International Conference on Coal Studies, Elsevier Science Publishers, Amsterdam 198, The Netherlands pp. 915–919.

Primary Examiner—Paul E. Konopka
Attorney, Agent, or Firm—David E. Breeden; Stephen D. Hamel; William R. Moser

[57] ABSTRACT

The regeneration of sulfur sorbents having sulfate forming tendencies and used for desulfurizing hot product gas streams such as provided by coal gasification is provided by employing a two-stage regeneration method. Air containing a sub-stoichiometric quantity of oxygen is used in the first stage for substantially fully regenerating the sorbent without sulfate formation and then regeneration of the resulting partially regenerated sorbent is completed in the second stage with air containing a quantity of oxygen slightly greater than the stoichiometric amount adequate to essentially fully regenerate the sorbent. Sulfate formation occurs in only the second stage with the extent of sulfate formation being limited only to the portion of the sulfur species contained by the sorbent after substantially all of the sulfur species have been removed therefrom in the first stage.

11 Claims, 4 Drawing Sheets

METHOD FOR REDUCING SULFATE FORMATION DURING REGENERATION OF HOT-GAS DESULFURIZATION SORBENTS

The United States Government has rights in this invention pursuant to the employer-employee relationship of the U.S. Department of Energy and the inventors.

BACKGROUND OF THE INVENTION

The present invention relates generally to the regeneration of particulate solid sorbents used for desulfurizing hot gases produced by the gasification of carbonaceous fuels, and more particularly to the method of regenerating such sorbents which have sulfating tendencies whereby the formation of sulfates during sorbent regeneration is substantially reduced.

During the gasification of carbonaceous fuels which contain sulfur, undesirable gaseous sulfur bearing compounds such as hydrogen sulfide ($H_2S$), carbonyl sulfide (COS), and carbon disulfide ($CS_2$) are produced. These corrosive and environmentally polluting sulfur-containing compounds have been successfully removed from hot product gas streams generated during the gasification of carbonaceous fuels by employing solid sorbents of metal oxides or mixed metal oxides such as copper oxides, iron oxides, and those containing zinc, especially in the form of zinc ferrite ($ZnFe_2O_4$) or zinc titanate ($Zn_2TiO_4$, $ZnTiO_3$, and $Zn_2Ti_3O_8$). Of these solid sorbents, the zinc containing sorbents have been found to be particularly satisfactory for use as hot gas desulfurization sorbents. Zinc-containing sorbents readily absorb the gaseous sulfur compounds from the hot fuel gas to provide a hot fuel gas stream essentially sulfur-free for use in applications such as electrical generating systems using gas turbines, fuel cells, process heating, or in the production of synthetic natural gas or chemicals.

Solid sorbents containing sulfur compounds removed from the sulfur-bearing hot fuel gas, have been essentially fully regenerated for reuse in an absorber, such as a fluidized bed absorber, for removing sulfur from fuel gas containing sulfur species. The regeneration of the sulfided zinc-containing sorbents is readily achieved in a regenerator vessel separate from the absorber by removing sulfided sorbents from the absorber and contacting the sorbents with air in the regenerator at an elevated temperature of at least about 800° F. so as to initiate an exothermic reaction between the oxygen and the sulfur species contained on the sorbents. During this exothermic reaction the temperature of the sorbent increases to a maximum temperature of about 1500° F. so as to convert sulfur species to sulfur oxides ($SO_2$, $SO_3$) in the sorbent regeneration gases. These sorbent regeneration gases are removed from the regenerator and disposed of or used in a suitable chemical process such as the formation of elemental sulfur. The solid sorbents are usually repeatedly cycled through the absorber and the regenerator.

In spite of the success of zinc-containing sorbents in the removal of virtually all of the sulfur species from hot fuel gas, it has been found that there is a tendency for many of the present day zinc-containing sorbents to form sulfates, primarily zinc sulfate ($ZnSO_4$), during the regeneration of the hot gas desulfurization sorbents. The formation of such sulfates is favored by higher concentrations of oxygen and sulfur oxides in the sorbent regeneration gases, and by higher pressures and lower temperatures in the regenerator. Sulfate formation is a result of undesirable side reactions occurring during the regeneration of the sorbent and has a considerable impact on the efficiency of the system. For example, the additional air required for sorbent regeneration due to sulfate formation introduces an efficiency penalty in the regenerator. Also, with sulfate present in the regenerated sorbent, relatively high exothermic sulfate reduction reactions occur in the absorber so as to detract from the efficiency of the system and cause considerable reduction in the heating value of the fuel gas. Further, there is a definite possibility that the structural integrity of the sorbents will be compromised either by sulfate-induced spalling during regeneration or by overheating and sintering of the particulate sorbents which may occur during sulfate reduction reactions in the absorber. Sulfate formation in sorbent regeneration processes using fluidized-bed regeneration also increases the required sorbent circulation rates between the absorber and the regenerator, which provides greater opportunity for attrition of sorbent particulates to occur. Such consequences adversely impact operating costs and the system efficiency by increasing sorbent make-up required for the system and also by increasing the energy required for circulating the sorbent.

SUMMARY OF THE INVENTION

Accordingly, it is a principal objective or aim of the present invention to reduce sulfate formation in solid particulate sorbents having sulfate forming tendencies by employing a two-stage sorbent regeneration process or method wherein the sorbent regenerating air is selectively controlled in each stage so as to provide sub-stoichiometric amounts of oxygen in the first stage of the regeneration process and oxygen amounts slightly greater than stoichiometric in the second stage of sorbent regeneration. Generally, the method of the present invention comprises the steps of: partially regenerating particulate sorbent containing sulfur species substantially formed of sulfides in a first region of a sorbent regenerator by contacting the particulate sorbent at an elevated temperature in the first region with a first gaseous oxygen-containing stream having less than the stoichiometric amount of oxygen required to essentially fully regenerate the sorbent by an exothermic reaction between the sulfur species and oxygen for promoting a first exothermic reaction with the sulfur species for substantially depleting the particulate sorbent of the sulfur species; moving the resulting partially regenerated sorbent from the first region of the sorbent regenerator into a second region thereof; and contacting the partially regenerated sorbent at an elevated temperature in the second region of the sorbent regenerator with a second gaseous oxygen-containing stream having a quantity of oxygen substantially corresponding to a stoichiometric amount adequate to essentially fully regenerate the sorbent by promoting a second exothermic reaction in the second region of the sorbent regenerator between the oxygen in the second stream and any sulfur species remaining in the partially regenerated sorbent introduced into the second region of the regenerator. By practicing this sorbent regeneration method, any sulfate formation in the particulate sorbent essentially occurs only during the regeneration of the already partially regenerated sorbent in the second region of the regenerator.

The method of the present invention maximizes regeneration of the particulate sorbent in the sorbent regeneration region or first stage where the margin of safety is greater for avoiding excessive sulfate formation so as to significantly reduce the amount of sulfur species remaining in the sorbent for regeneration in the second sorbent regeneration region or stage where the tendency or opportunity to form sulfate is greater than in the first stage and the process is particularly sensitive to the use of an optimum air-sorbent ratio.

Another object of the present invention is to provide for the production of sorbent regeneration gas streams with high $SO_2$ concentrations by conducting the regeneration with undiluted, essentially stoichiometric amounts of air without excessive formation of sulfate.

Another object of the present invention is to provide a sorbent regeneration method wherein the air requirements for regeneration are minimized so as to provide an increase in system efficiency.

A further object is to reduce the amount of sulfate contained by the regenerated sorbent so as to substantially reduce the extent of the highly exothermic sulfate reduction reactions in the absorber so as to overcome the system efficiency penalty due to the loss of fuel gas heating values as well as reducing possible sorbent damage and attrition due to overheating, sintering, and spalling.

A still further object of the present invention is to reduce sorbent circulation rates as a result of improved sorbent regeneration, thereby lessening the opportunity for particle attrition to occur.

A still further object of the present invention is to provide for the two-stage regeneration of particulate solid sorbents having sulfate forming tendencies in a fluidized bed regenerator for reducing sulfate formation of particulate sorbent contacted in an absorber by hot fuel gases produced by the gasification of a carbonaceous material containing sulfur values.

Other and further objects of the method of the present invention will become obvious upon an understanding of the illustrative embodiments about to be described or will be indicated in the appended claims, and various advantages not referred to herein will occur to one skilled in the art upon employment of the invention in practice. Also, while the method of the present invention is primarily directed to the regeneration of particulate zinc-containing sorbents such as zinc ferrite and zinc titanate, it is to be understood that the present invention is not limited to the regeneration of these sorbents since it can be beneficially used for any metal oxide or mixed metal oxide desulfurization sorbents having sulfate forming tendencies such as the oxides of copper, iron, manganese, and nickel.

Preferred embodiments of apparatus useable for the practice of the method of the present invention have been chosen for the purpose of illustration and description. The preferred embodiments illustrated are not intended to be exhaustive nor to limit the invention to the practice of the method in the precise forms of apparatus shown. The preferred embodiments are chosen and described in order to best explain the principles of the invention and their application and practical use to thereby enable others skilled in the art to best utilize the method of this invention in various embodiments and modifications as are best adapted to the particular use contemplated.

DETAILED DESCRIPTION OF THE INVENTION

Figure 1:
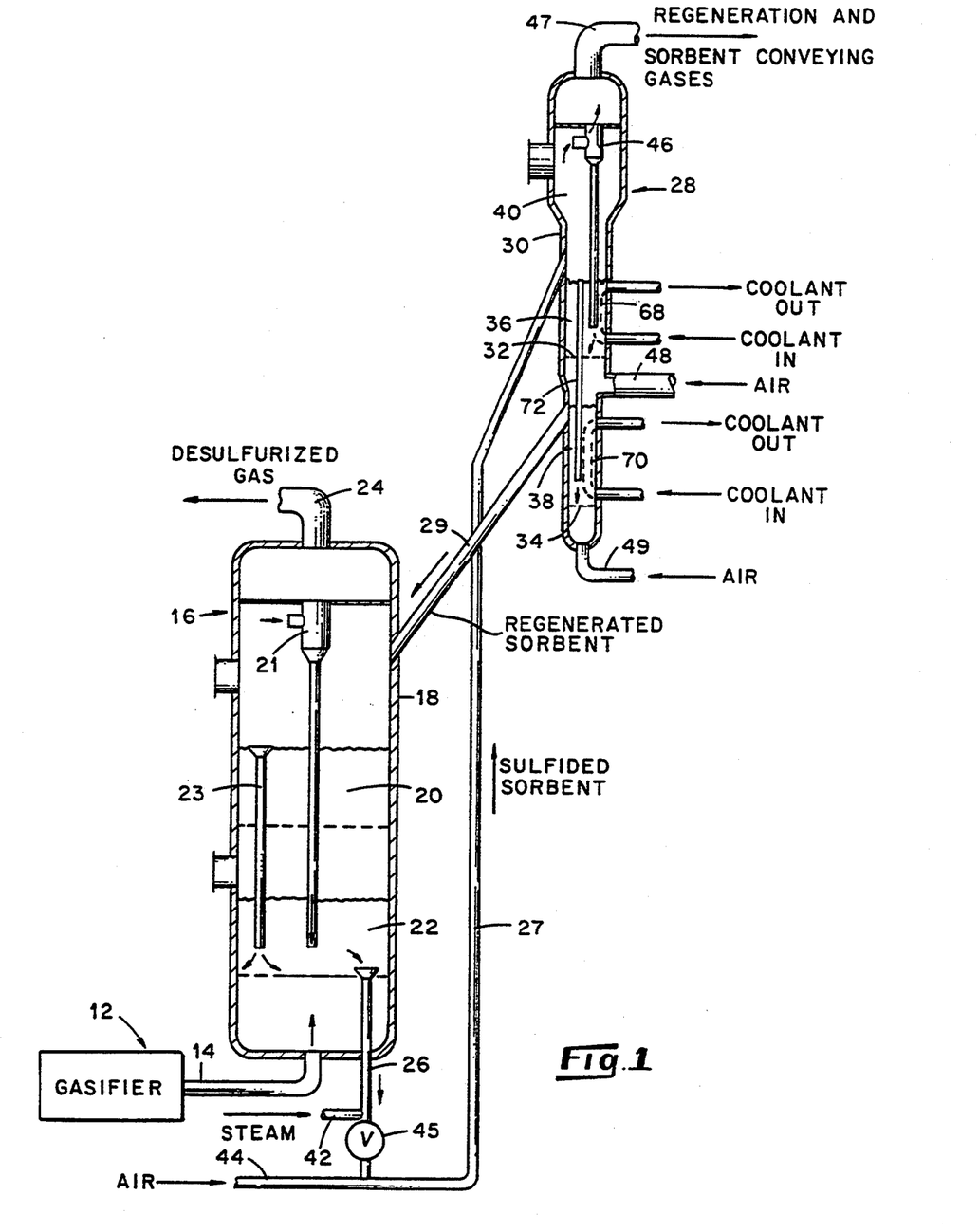
FIG. 1 is a schematic view of a sorbent regenerator for a gasification system with the regenerator employing a continuous sorbent circulation loop through fluidized beds in the absorber and in the two-stage sorbent regenerator wherein bed temperatures are controlled by employing internal heat exchange surfaces and wherein sorbent regeneration gases discharged from the second stage of the regenerator are combined with the air used for the sorbent regeneration in the first stage of the sorbent regenerator.
Figure 3:
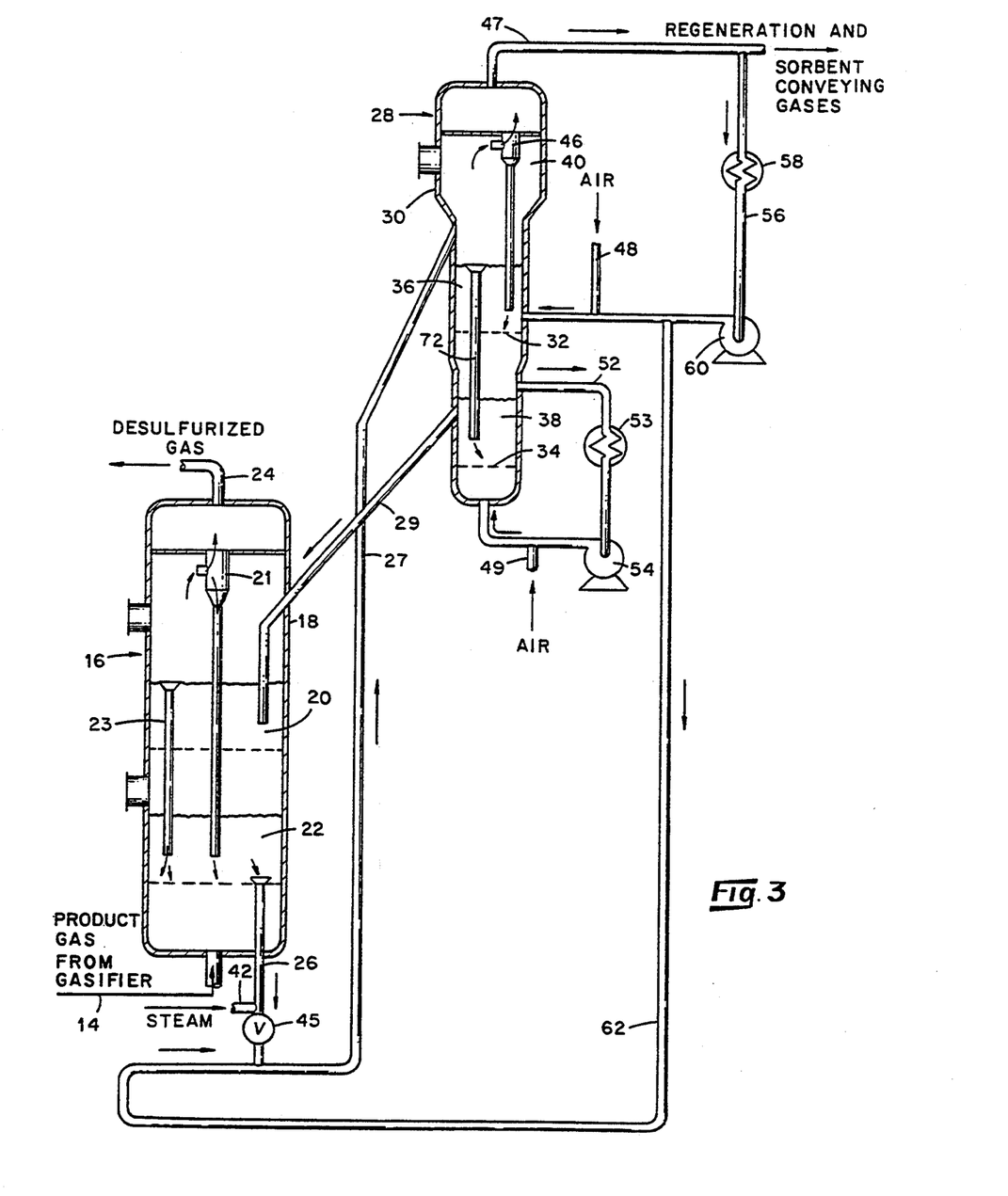
FIG. 3 is a schematic view of another embodiment of a two-stage sorbent regeneration system using fluidized beds in the regenerator wherein the sorbent regeneration gases in each stage of the sorbent regeneration method are provided by air suitably diluted with a portion of the regeneration gases discharged from the sorbent regenerator for bed temperature control.
Figure 4:
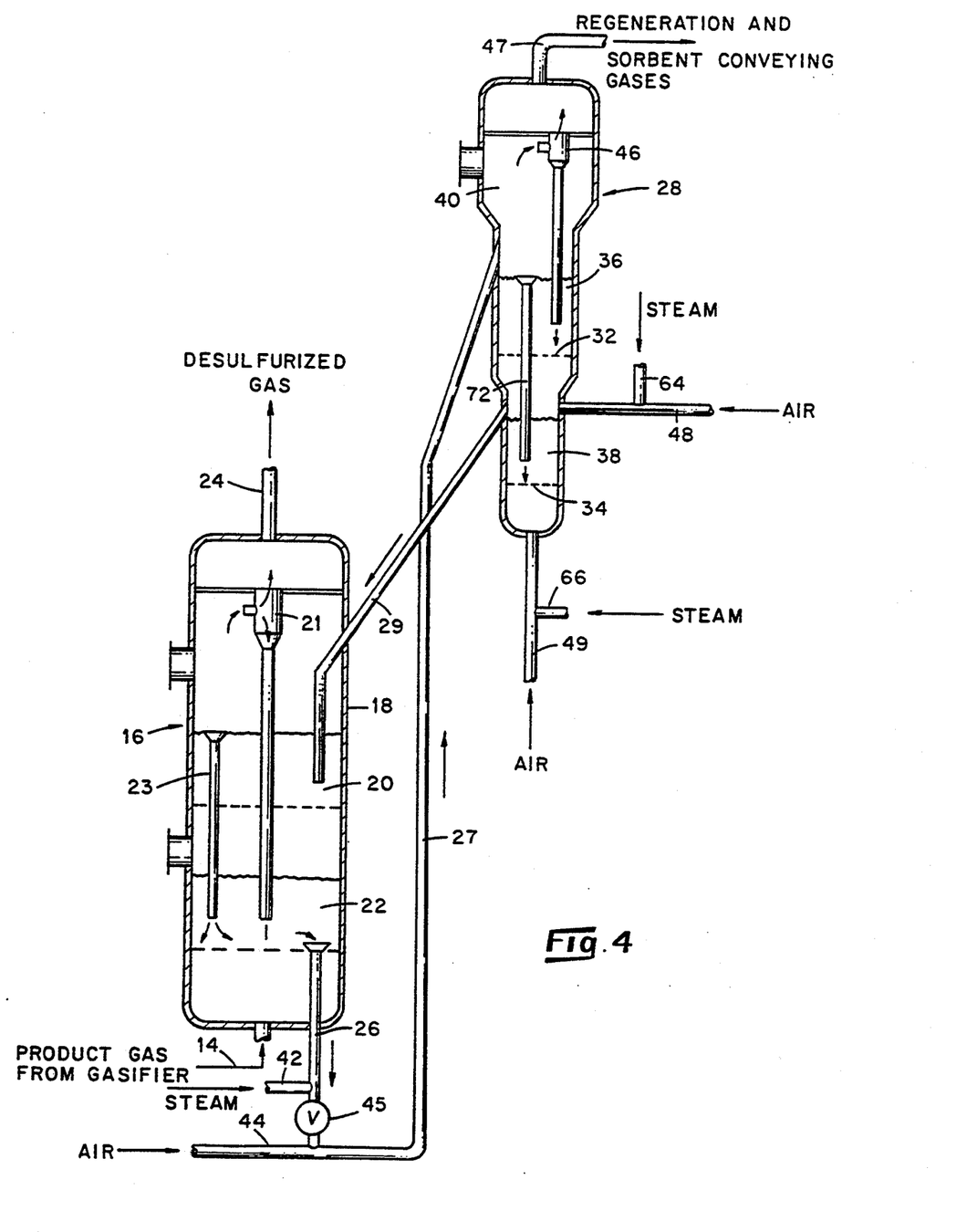
FIG. 4 is a schematic view of a further embodiment of the present invention generally corresponding to that of FIG. 1 but using sorbent regeneration gases in both the first and the second stage as provided by air diluted with steam for bed temperature control so as to provide the desired stoichiometric ratios in each stage of the two-stage sorbent regeneration method of the present invention.

With reference to the accompanying drawings, the method of the present invention is shown being utilized in sorbent regeneration systems employing fluidized beds with the particulate sorbent flowing from the absorber to the regenerator in a continuous circulating manner. As illustrated in FIGS. 1-4, hot product gases or fuel gases are produced in a gasifier 12 wherein sulfur-containing carbonaceous fuels in solid, liquid, or gaseous form such as coal, peat, biomass, and liquid or gaseous petroleum products are consumed at pressures in the range of about 0 to about 2000 psig and at temperatures in the range of about 800° to 2500° F. The fuel gases produced by such gasification operations, particularly in the gasification of coal, often contain considerable quantities of sulfur species such as described above. These sulfur-containing fuel gases are conveyed from the gasifier 12 via a suitable conduit 14 to an absorber 16 containing particulate sorbent, preferably a zinc-containing sorbent such as zinc ferrite or zinc titanate. The sulfur species produced during the gasification of the carbonaceous material in the gasifier 12 are contained in the fuel gas which, after being cooled directly or indirectly as necessary, enters the absorber 16 at a temperature in the range of about 800° to 1500° F. and contacts the particulate sorbent to react therewith in a well known manner for removing the sulfur species from the fuel gas. The absorber 16 is shown in FIGS. 1, 3, and 4, formed of a vertically oriented housing 18 containing vertically spaced apart beds 20 and 22 of particulate sorbent which are fluidized by the fuel gases entering the base of the absorber 16 and interconnected by a standpipe 23. The desulfurized fuel gas or product gas is discharged from the top of the absorber 16 through a suitable line 24 for conveyance thereof to a suitable use application such as described above. Particulates in the desulfurized gas from bed 20 may be removed and recycled to bed 20 or to bed 22, as shown, by the use of an internal cyclone such as generally shown at 21 or any other suitable gas-solid separating mechanism usable in the free-board region of the absorber 16, so as to minimize sorbent loss and particulate carry-over in the desulfurized gas stream discharged through line 24.

In accordance with the present invention the sulfided sorbent resulting from the reaction between the hot fuel gas and the sorbent in the absorber 16 is removed from the absorber 16 via standpipe 26 and then conveyed through line 27 to the regenerator 28 wherein the sulfided sorbent is contacted with an oxygen-containing gas such as air for regenerating the sorbent by an exothermic reaction which occurs at a temperature in the range of about 800° to 1500° F. between the sulfur species contained in the sorbent and the oxygen in the air. This exothermic reaction provides an off-gas or regeneration gas stream formed primarily of sulfur oxides and nitrogen (from the air) and substantially depletes the particulate sorbent sulfur species. The regenerated particulate sorbent is then returned to the absorber 16 through line 29 for reuse in the absorber 16 for removing sulfur species from the hot fuel gases.

While the absorber 16 utilized in the present invention is preferably a fluidized-bed absorber so that the sorbent may be continuously circulated between the absorber 16 and the regenerator 28 where the sulfided sorbent is reacted with air to restore its activity and then returned to the absorber 16, it will appear clear that other types of absorbers may be utilized for depleting fuel gases of sulfur species to provide the sulfided sorbent used in the sorbent regeneration method of the present invention. For example, a single moving bed of sorbent may be used in the absorber for the capture of sulfur species. In fact, in the method of the present invention the sorbent may be continuously or periodically supplied to the regenerator at a relatively high temperature from any source since the principal features of the invention involves the staged regeneration of the hot sulfided sorbent in the regenerator regardless of the source of the sulfided sorbent In order to assure that the regeneration beds in the regenerator 28 are adequately fluidizable, a sorbent particle size in the range of about 50 to 1000 microns is preferred.

As illustrated in FIGS. 1-4, the regenerator 28 is formed of a vertically oriented vessel or housing 30 containing vertically spaced apart grids 32 and 34 which are respectively used for supporting upper and lower beds 36 and 38 of particulate solid sorbent. Sulfided sorbent is transported from the absorber 16 through the conduit 27, which functions as a riser tube, to the free-board region 40 located in the upper portion of the regenerator 28 or, alternatively, directly into the upper bed 36 of the regenerator 28. The transportation of the sulfided sorbent from the absorber 16 to the regenerator 28 may be achieved in any suitable manner but is preferably transported pneumatically by using a motive fluid such as air, steam, regeneration gases, or mixtures thereof. Since there are efficiency advantages to be gained in the present invention by minimizing the amount of motive fluid used to transport the sulfided sorbent, regeneration is not desired in the riser tube 27 since under these circumstances such regeneration could cause an excessive temperature to occur, which could be detrimental to the sorbent.

Also as illustrated in FIGS. 1-4, the regenerator 28 is preferably located in a horizontal plane generally higher than the absorber 16 so that gravity flow may be utilized for recycling the regenerated sorbent from the regenerator 28 into the absorber 16 through line 29 without using a conveying fluid which would tend to dilute the desulfurized product gases discharged from the absorber 16. However, alternatively, a suitable conveying fluid can be used to recycle the regenerated sorbent from the regenerator 28 into the absorber 16 through any suitable transfer line, thereby allowing any relative location of the regenerator 28 with respect to the absorber 16. As shown in FIG. 1, the sulfided sorbent discharged from the absorber 16 into the riser tube 27 is first contacted in standpipe 26 with steam at a temperature in the range of about 400° to 800° F. via line 42 and then with air through line 44 for conveying the sulfided sorbent to the regenerator 28. The steam is utilized to cool the sulfided sorbent to a temperature less than about 800° F. to assure that regeneration of the sorbent is not initiated in the riser tube or conduit 27 for the reason described above. Also, the steam from line 42 primarily rises in standpipe 26 and strips entrained fuel gas from the descending sulfided sorbent and thus returns the fuel gas to the absorber bed 22 and prevents the undesired intermingling of fuel gas with the air entering from line 44. The circulation rate of sorbent is readily regulated by using a suitable control valve 45 at a location on the standpipe 26 near the lower end thereof. This valve 45 may be a control valve such as conventionally used in catalytic cracking units of petroleum refineries.

The sulfided sorbent is separated from the motive fluid in the free-board region 40 of the regenerator 28 by the use of an internal cyclone such as generally shown at 46 or any other suitable gas-solid separating mechanism usable in the free-board region 40 of the regenerator 28. Alternatively, the motive fluid and sulfided sorbent from the riser tube 27 can be directly injected by suitable means into the upper bed 36 of the regenerator 28.

The gases used to transport the sulfided sorbent from the absorber 16 to the regenerator 28 are discharged from the regenerator 28 through a discharge line 47 placed at the top of the regenerator 28. This line 47 is also used for removing from the regenerator 28 the sulfur-containing regeneration gases resulting from the regeneration of the sorbent. The sulfided sorbent conveyed into the regenerator 28 through the riser tube 27 forms the upper bed 36 in the regenerator 28 that functions as the first stage of the two-stage sorbent regeneration method of the present invention. The sulfided sorbent in the upper bed 36 is fluidized by the combined flow of regeneration gases discharged from the lower bed 38 of the regenerator 28 which functions as the second stage of the two-stage sorbent regeneration method and air introduced into the sorbent regenerator 28 through line 48 connected thereto at a location above the lower bed 38 and underlying the grid 32. The lower bed 38 of sorbent in the regenerator 28 is fluidized by a stream of air introduced into the regenerator 28 at the base thereof through line 49 and thence through grid 34 at a volume sufficient to provide oxygen amounts slightly greater than stoichiometric as will be described in greater detail below.

Figure 2:
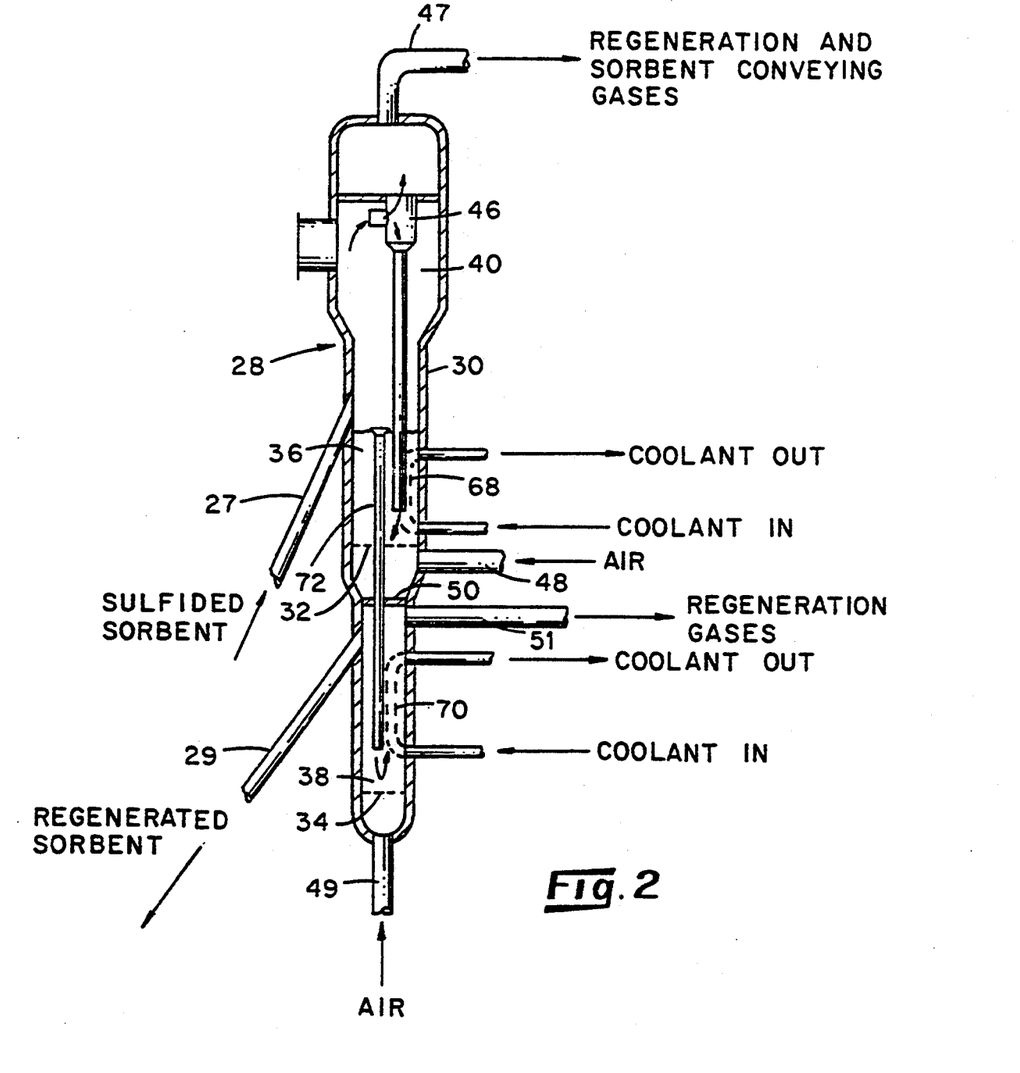
FIG. 2 is a fragmentary schematic view of a modification of the sorbent regeneration system of the FIG. 1 embodiment wherein the sorbent regeneration gases discharged from the second or final stage of the sorbent regeneration method of the present invention are removed from the regenerator without mixing with the air used in the first stage.

The embodiment of FIG. 2 differs from that of FIG. 1 in that the upper and lower beds 36 and 38 are isolated from one another by a plate 50. Thus, the bed-fluidizing and reaction gases for regenerating the sulfided sorbent in the upper bed 36 or the first stage of the regenerator 28 are provided by the stream of air introduced through the conduit 48 while the regeneration gases discharged from the lower bed 38 or the second stage of the regenerator are discharged from the regenerator 28 via line 51 without being admixed with air introduced into the upper bed 36 through conduit 48. This embodiment may be advantageous when undiluted air is needed or desired in the upper stage of the regenerator 28 for more effective regeneration, or when two separate regeneration streams with differing $SO_2$ concentrations are desired.

In the embodiment of FIG. 3 the bed-fluidizing and sorbent-regeneration gases used in the second stage 38 are partially provided by recirculating about 50 to 95 percent of the regeneration gas discharged from the lower bed 38 through a conduit 52 connected at one end to the regenerator 28 at a location overlying the lower bed 38 and at the other end to the regenerator 28 at a location underlying the grid 34 supporting the lower bed 38. Air in suitable quantities is added to this recycled regeneration gas through line 49 to provide a quantity of oxygen in the lower bed 38 slightly greater than the stoichiometric amount for effecting the desired final regeneration of the particulate sorbent contained in the second stage or lower bed 38 of the regenerator 28. A heat exchanger 53 is shown coupled in line 52 for removing exothermic reaction heat and for regulating the temperature of the recycling regeneration gas in order to maintain the sorbent in the lower bed 38 to a reaction temperature in the range of about 800° to 1500° F. Also, a compressor 54 is used in line 52 for the purpose of pressurizing the recycling regeneration gas to a suitable pressure to compensate for the pressure losses in the recycle loop. A substantially similar regeneration gas recycling arrangement is also used in the upper bed 36 wherein the regeneration gas employed for partially regenerating the sorbent in the first stage is partially provided by recirculating about 35 to 90 percent of the regeneration gases discharged from the regenerator 28 via line 47 through line 56 containing a heat exchanger 58 and a compressor 60 for respectively regulating the temperature and pressure of the recycled gas for admixture with the air being introduced into the regenerator 28 through line 48 connected to the base of the upper bed 36. Air in suitable quantities is added to this recycled regeneration gas through line 48 to provide substoichiometric amounts of oxygen in the upper bed 36.

The admixing of selected quantities of recycled regeneration gas and air in the upper and lower sorbent regeneration beds dilutes the air and limits the overall temperature increase of the admixed gases flowing up through beds 36 and 38. Also, such admixing of the recycled regeneration gas and the air provides adequate volumes of the gaseous mixtures for fluidizing the sorbent in the upper and lower beds and the use of the heat exchangers 53 and 58 removes the exothermic reaction heat in the upper and lower sorbent-regeneration beds 36 and 38.

A further feature of the FIG. 3 embodiment is provided by passing a portion of the compressed recycled regeneration gases from the upper bed 36 through conduit 62 connected between line 56 downstream of the heat exchanger 58 and the sorbent transporting line 27 for admixture with some of the steam from line 42 in the sorbent discharge line 26 and thereby eliminating the air required for lifting the sulfided sorbent into the freeboard region 40 of the regenerator 28.

In the FIG. 4 embodiment selected quantities of steam rather than recycled regeneration gases as in FIG. 3 are admixed via steam lines 64 and 66 with the sorbent regeneration air introduced into the upper and lower beds 36 and 38 of the regenerator 28 through air lines for sufficiently diluting the air entering each bed to provide the desired bed-fluidization and the desired control over the exothermic reaction temperature occurring during the regeneration of the sorbent.

In the embodiments of FIGS. 1 and 2, the exothermic reaction and bed temperature in the upper and lower beds 36 and 38 in the regenerator are selectively controlled by employing internal heat exchange surfaces such as tube bundles generally shown at 68 in the upper bed 36 and at 70 in the lower bed 38. A heat-exchange fluid (shown as coolant in FIGS. 1 and 2) such as water or the like is circulated through these tube bundles 68 and 70 for removing exothermic reaction heat and for controlling the regeneration reaction temperature. The steam or other heated fluid generated from this heat exchange operation may be generally used in the process such as for preheating the air introduced into the regenerator 28 through lines 48 and 49 or advantageously integrated with the application such as for providing steam for electrical power generation via a steam turbine.

The FIG. 3 embodiment has higher volumetric flow of gases through the regenerator 28 compared to the gas flow through the regenerator 28 in the embodiments of FIGS. 1 and 2, and thus a larger regeneration vessel may be required with the FIG. 3 arrangement. Also, there are some additional capital expenses in the FIG. 3 arrangement due to the need for the heat exchangers and recycle gas compressors, but this arrangement eliminates possible concerns due to the structural integrity of the inbed tube bundles used for the bed temperature control in the embodiments of FIGS. 1 and 2 and increases turndown flexibility through independently controllable regeneration gas recycle rates and heat removal rates in heat exchangers 53 and 58.

In FIG. 4 the use of the steam for diluting the regeneration air provides for controlling temperature rise of the regeneration gases flowing up through the sorbent regeneration beds 36 and 38 so that no additional means such as heat exchangers or tube bundles are required for removing the regeneration heat so that this regeneration heat will leave the regeneration process as sensible heat in the regeneration gas stream. However, due to the dilution of the air with the steam, the concentration of the sulfur oxides in the regeneration gas is lower than obtainable with the embodiments of FIGS. 1-3.

In the method of the present invention, the quantity of oxygen in the bed-fluidizing and sorbent-regenerating gases entering the upper bed 36 or the first stage of sorbent regeneration is sub-stoichiometric, i.e., the gases contain a quantity of oxygen less than the stoichiometric amount required to fully and ideally regenerate the sorbent by the exothermic reaction between the sulfur species supported by the sorbent and the oxygen in the gases. By using sub-stoichiometric oxygen in the exothermic reaction in the upper bed 36, sulfate formation is excluded during the regeneration of the sorbent which depletes the sorbent of about 50% to greater than 99% of the sulfur species originally contained therein. This partially regenerated sorbent is then transported to the lower bed 38 where the second stage of the sorbent regeneration operation occurs and where the quantity of oxygen provided in the bed-fluidizing and sorbent-regenerating gases is slightly greater than the stoichiometric amount required for fully and ideally regenerating the sorbent. By providing oxygen near and especially slightly above the stoichiometric amount in the sorbent regenerating reaction in the lower bed 38, other species such as zinc sulfate are formed. However, since only a minor portion of the sulfur species originally supported by the sulfided sorbent introduced into the regenerator 28 is supported on the partially regenerated sorbent entering the lower bed, only this minor portion is subject to sulfate formation so as to significantly reduce the amount of sulfates in the regenerated sorbent discharged from the regenerator 28 and recycled to the absorber 16.

By employing an equilibrium analysis for the regeneration of sulfided zinc ferrite at 1400° F. and 17 atmospheres pressure with air, it was found that with zinc ferrite sulfided to contain about 7 to 8 wt % sulfur, which corresponds to a typical utilization of zinc ferrite in a fluidized bed absorber, and with regeneration gases in the upper bed 36 containing a quantity of oxygen corresponding to about 50 to 85% of the stoichiometric amount required for fully regenerating the sorbent, that about 56% to about 99.6% of the sulfur species are removed from the sorbent without any sulfate formation occurring in the upper stage. However, when using oxygen quantities greater than about 85% of the stoichiometric amount in the regenerating gas in the first stage undesirable sulfate formation was found to occur. For example, with regenerating gas containing a quantity of oxygen corresponding to about 90% of the stoichiometric amount required to fully regenerate the sorbent, only about 82% of the sorbent is regenerated in the upper bed 36 with the balance of about 18% of the sulfur species originally in the sorbent forming sulfates in the sorbent. Therefore, in accordance with the present invention the maximum amount of oxygen used in the upper stage 36 is to be maintained at a sub-stoichiometric level corresponding to less than about 85% of the stoichiometric amount of oxygen required to fully and ideally regenerate the sorbent.

In the embodiments of FIGS. 1-4, the partially regenerated sorbent is conveyed from the upper bed 36 to the lower bed 38 or the second stage via a standpipe 72. In the lower bed 38 the partially regenerated sorbent is contacted with a quantity of sorbent regenerating gases containing oxygen in an amount greater than the stoichiometric amount required for fully and ideally regenerating the partially regenerated sorbent. The equilibrium analysis indicated that if a quantity of air corresponding to 100% of the stoichiometric amount of oxygen required to fully regenerate the sorbent were used in the lower bed 38 that essentially all of the remaining sulfur species would be converted to zinc sulfate while for a quantity of air corresponding to about 102% of stoichiometric oxygen only about 14% of the sulfur species would be converted to zinc sulfate. Furthermore, for a quantity of air corresponding to about 105% of the stoichiometric amount of oxygen, about 37% of sulfur species would be converted to zinc sulfate. Thus, the oxygen quantities used in the lower bed 38 or the second and final stage of sorbent regeneration are preferably in the range of slightly greater than 100% to about 105% of the stoichiometric amount of oxygen required to fully and ideally regenerate the partially regenerated sorbent entering the lower bed 38.

In typical zinc ferrite sorbent regeneration operations at 17 atmospheres pressure practiced in accordance with the method of the present invention with the sorbent regenerating gas supplied to the upper bed 36 and the lower bed 38 respectively containing 75% and 105% of the stoichiometric amount of oxygen, with a maximum exothermic reaction temperature of 1400° F. in the first and second sorbent regenerating stages, and an air feed temperature of 500° F. for both stages and where the sorbent regenerating gases entering the upper bed 36 are at a temperature greater than 500° F., except for the FIG. 2 embodiment where the regenerating gases entering the upper bed 36 are air only at a temperature of 500° F., and with the sorbent being introduced into the upper bed 36 at 800° F. and into the lower bed 38 from the upper bed 36 at 1400° F., the overall oxygen requirement for the sorbent regeneration process is 101.25% of the stoichiometric amount. This oxygen requirement is adequate for regenerating the sorbent to about 95.3% of complete or ideal regeneration so that only the balance of 4.7% of the sorbent sulfur originally present remains with the regenerated sorbent in the form of zinc sulfate.

In the regeneration of the sulfided zinc ferrite, the conversion of iron sulfide (FeS) to magnetite ($Fe_3O_4$) is favored over the conversion of zinc sulfide (ZnS) to zinc oxide (ZnO). Thus, when using lower sub-stoichiometric levels of oxygen in the first stage of the present two-stage sorbent regeneration method the sorbent is predicted to form a mixture of magnetite, ZnO and unregenerated ZnS. If the available oxygen in the system is increased towards that of a full stoichiometric amount, a point in the reaction would be reached where zinc sulfate rather than sulfur dioxide ($SO_2$) becomes the thermodynamically favored species. Magnetite is predicted to remain as a stable form of iron up to 100% of stoichiometric oxygen. If the available oxygen in the system is further increased to over a full stoichiometric amount, hematite ($Fe_2O_3$) and zinc ferrite become stable species and a sharp reduction in the tendency to form zinc sulfate occurs.

There is also an indication that with the two operating regimens present in the two-stage sorbent regenerating reaction overall tendency for sulfate formation is relatively low when using the first operating regimen under sub-stoichiometric conditions in the first stage and the second operating regimen under stoichiometric conditions slightly greater than full stoichiometry in the second stage. Thus, while essentially complete regeneration of the sorbent with fairly low sulfate formation may be possibly achieved in a properly designed single stage regenerator if operated sub-stoichiometrically with oxygen quantities slightly less than required for incipient sulfate formation such as the maximum 85% of stoichiometry used in the first stage of the present method or just slightly in excess of stoichiometry, such as about 101.25% with respect to overall stoichiometry such as typically used in the second stage of the present method, it is expected that sorbent regeneration under such conditions would be very difficult to achieve and control in a practical and reproducible manner since such an operation is inherently unstable. For example, relatively small errors in providing the necessary oxygen-to-sorbent ratio would result either in an incomplete or unacceptable level of sorbent regeneration when insufficient air is supplied or in an excessive or unacceptable level of sulfate formation when excessive air is supplied. On the other hand, by employing the two-stage sorbent regeneration method of the present invention, a significantly greater safety margin for obtaining nearly complete sorbent regeneration without excessive sulfate formation is achieved by substantially regenerating the sorbent with sub-stoichiometric oxygen in the first stage. In this first stage the quantity of oxygen that can be supplied without any sulfate formation is in a relatively broad range (e.g. about 50 to 85% of the stoichiometric amount), thereby limiting or minimizing the residual sulfur in the partially regenerated sorbent to be regenerated in the second stage where the quantity of oxygen that can be supplied without excessive sulfate formation is in a much narrower range (e.g. about 102 to 105%) of the second stage stoichiometric requirement.

In the present invention it is necessary to have some unregenerated sulfur species pass from the first stage into the second stage so that an exothermic reaction can be provided in the second stage to provide the regeneration temperatures needed for fully regenerating the sorbent in the second stage.

The Table below is derived from an equilibrium analysis of the present method in order to further illustrate desirable sorbent regeneration features of the present invention. This Table is illustrative of the performance of a two-stage sorbent regenerator for regenerating sulfided zinc ferrite sorbent at conditions described above in which 75% of stoichiometric oxygen is supplied to the first stage or upper bed 36 and 105% of stoichiometric oxygen to the second stage or lower bed 38.

TABLE

| | |
|---|---|
| Bed temperature | 1400° F. (both stages) |
| Sorbent temperature | |
| To first stage | 800° F. |
| To second stage | 1400° F. |
| Regeneration air feed temperature | 500° F. (both stages) |
| Regeneration air requirement | % of stoichimetric |
| First stage | 75.00 |
| Second stage | 105.00 |
| Overall | 101.25 |
| Oxygen in air requirement | Mole/100 lb sorbent |
| First stage | 0.349 |
| Second stage | 0.122 |
| Overall | 0.472 |
| Sulfur content (regen. sorbent) | % by weight |
| Discharged from first stage | 1.05 (sorbent MW = 236.98) |
| Discharged from second stage | 0.37 (sorbent MW = 243.31) |
| Sulfate content (regen. sorbent) | % of residual sulfur |
| Discharged from first stage | 0 (all sulfur as ZnS) |
| Discharged from second stage | 100 (all sulfur as $ZnSO_4$) |

It will be seen that the present invention provides a method for substantially reducing the formation of undesirable sulfates during the regeneration of solid particulate sorbents used in hot gas desulfurization operations when employing sorbents having sulfating tendencies so as to significantly increase the overall efficiency of the hot gas desulfurization process.

What is claimed is:

1. A method for regenerating hot-gas desulfurization sorbents with sulfating tendencies to minimize the concentration of sulfates in the regenerated sorbent, comprising the steps of partially regenerating a bed of particulate sorbent containing sulfur species substantially formed of sulfides in a first region of a sorbent regenerator by contacting the bed of particulate sorbent at an elevated temperature with a first stream of oxygen-containing gases at a sufficient volume and velocity for fluidizing the bed of particulate sorbent in said first region and for promoting a first exothermic reaction in said first region between the oxygen and the sulfur species for substantially regenerating the particulate sorbent in said first region to about 56% to substantially 100% of full regeneration without sulfate formation, said first stream having therein a quantity of oxygen corresponding to about 50% to 85% of the stoichiometric amount required for fully regenerating the sorbent by the exothermic reaction between the available oxygen and sulfur species, moving the resulting partially regenerated sorbent from an uppermost portion of the fluidized bed of particulate sorbent in said first region into a second region of the regenerator, and contacting a bed of the partially regenerated sorbent at an elevated temperature in said second region with a second stream of oxygen-containing gases at a sufficient volume and velocity for fluidizing the bed of partially regenerated sorbent in said second region with said second stream containing a quantity of oxygen substantially corresponding to greater than 100% to about 105% of a stoichiometric amount required to regenerate the sorbent to 100% of full regeneration by promoting an exothermic reaction in said second region between the oxygen in said second stream and any sulfur species remaining in the partially regenerated sorbent introduced in said second region of the regenerator, whereby any sulfate formation in the particulate sorbent essentially occurs only during the regeneration of the partially regenerated sorbent in the second region of the regenerator.

2. The method for regenerating a hot-gas desulfurization sorbent as claimed in claim 1, wherein the regenerated particulate sorbent contains less than about 5 wt % of the original sulfur as sulfate.

3. The method for regenerating a hot-gas desulfurization sorbent as claimed in claim 1, wherein the particulate sorbent is zinc ferrite, zinc titanate, iron oxide, copper oxide, manganese oxide, nickel oxide, or combinations thereof.

4. The method for regenerating a hot-gas desulfurization sorbent as claimed in claim 1, wherein said first and said second stream of gases are respectively converted to sulfur-containing gases essentially depleted of oxygen and at elevated temperatures, wherein said sulfur-containing gas streams are respectively discharged as first and second streams of regeneration gas from the first and the second regions of the regenerator.

5. The method for regenerating a hot-gas desulfurization sorbent as claimed in claim 4, including the additional step of combining the second stream of regeneration gas with said first stream of gases prior to the introduction of the resulting combined gaseous stream into the first region of the regenerator for reducing the concentration of the oxygen in the first stream of gases contacting the sorbent in said first region to said quantity of oxygen.

6. The method for regenerating a hot-gas desulfurization sorbent as claimed in claim 4, including the additional step of combining a portion of the second stream of regeneration gas with the second stream of gases prior to the introduction of the resulting combined stream into the second region of the regenerator and regulating the temperature of said portion of the second stream of regeneration gas for maintaining the temperature of the exothermic reaction in the second region at a temperature in the range of about 800° to 1500° F.

7. The method for regenerating a hot-gas desulfurization sorbent as claimed in claim 6, including the additional step of combining a portion of the first stream of regeneration gas with the first stream of gases prior to the introduction of the combined gaseous stream into the first region of the regenerator and regulating the temperature of said portion of the first stream of regeneration gas for controlling the temperature of the exothermic reaction in the first region.

8. The method for regenerating a hot-gas desulfurization sorbent as claimed in claim 7, including the additional step of combining the balance of the second stream of regeneration gas with the first stream of gases in the first region of the regenerator, and wherein the first and the second stream of gases substantially comprise air.

9. The method for regenerating a hot-gas desulfurization sorbent as claimed in claim 4, including the additional step of combining steam with the first and second stream of gases for providing each of the first and second streams of gases at said sufficient volume for fluidizing the beds of particulate sorbent in the first region and in the second region, for controlling the temperature of the exothermic reactions in the first and second regions, and for reducing the concentration of the oxygen in the first stream of gases contacting the sorbent in said first region to said quantity of oxygen.

10. The method for regenerating a hot-gas desulfurization sorbent as claimed in claim 4, including the steps of supporting the fluidized beds of particulate sorbent at vertically spaced apart locations within the regenerator to define the fluidized beds of particulate sorbent in the first and second regions with the fluidized bed of particulate sorbent in the first region overlying the second region, and wherein the first and second streams of oxygen-containing gases flow upwardly through the beds of particulate sorbent in the first and second regions of the regenerator for the fluidizing the beds of particulate sorbent.

11. The method for regenerating a hot-gas desulfurization sorbent as claimed in claim 4, including the additional step removing exothermic heat from within the first and second regions for controlling the sorbent regeneration reaction temperature in the first and second region.

* * * * *